(12) United States Patent
Schutt

(10) Patent No.: US 7,377,488 B2
(45) Date of Patent: May 27, 2008

(54) TELESCOPING LANDING GEAR

(75) Inventor: Randy L. Schutt, Holland, MI (US)

(73) Assignee: SAF-Holland, Inc., Holland, MI (US)

( * ) Notice: Subject to any disclaimer, the term of this patent is extended or adjusted under 35 U.S.C. 154(b) by 0 days.

(21) Appl. No.: 11/447,696

(22) Filed: Jun. 6, 2006

(65) Prior Publication Data

US 2006/0283646 A1    Dec. 21, 2006

Related U.S. Application Data

(60) Provisional application No. 60/687,781, filed on Jun. 6, 2005.

(51) Int. Cl.
*B60S 9/02* (2006.01)

(52) U.S. Cl. ...................... 254/419; 254/425

(58) Field of Classification Search ................ 254/419, 254/418, 420–425
See application file for complete search history.

(56) References Cited

U.S. PATENT DOCUMENTS 4,129,322 A * 12/1978 Kuntz, Jr. .................. 254/419
5,871,069 A * 2/1999 Carmitchel .................. 187/231
6,893,006 B2 * 5/2005 Drake, III .................... 254/425
7,152,848 B2 * 12/2006 Pfleging et al. ............. 254/419
2004/0099853 A1 * 5/2004 Verakis ........................ 254/343
2006/0108571 A1 * 5/2006 Verakis et al. ............... 254/342

* cited by examiner

*Primary Examiner*—Lee D. Wilson
(74) *Attorney, Agent, or Firm*—Price, Heneveld, Cooper, DeWitt & Litton, LLP

(57) ABSTRACT

A landing gear assembly comprises a first leg member adapted to couple to a vehicle frame member, and a second member operably coupled to the first leg member and moveable between a raised storage position and a lowered in-use position. The landing gear assembly further comprises a flexible member operably coupled with the drive mechanism and the second leg, such that the drive mechanism extends the flexible member and moves the second leg from the storage position to the in-use position, and wherein the flexible member is adapted to support a weight exerted on the first and second legs. In certain embodiments disclosed herein, the flexible member comprises a ribbon constructed of natural fibers. Other embodiments comprise additional pulleys and flexible members adapted to raise the second leg member from the in-use position to the raised storage position.

22 Claims, 3 Drawing Sheets

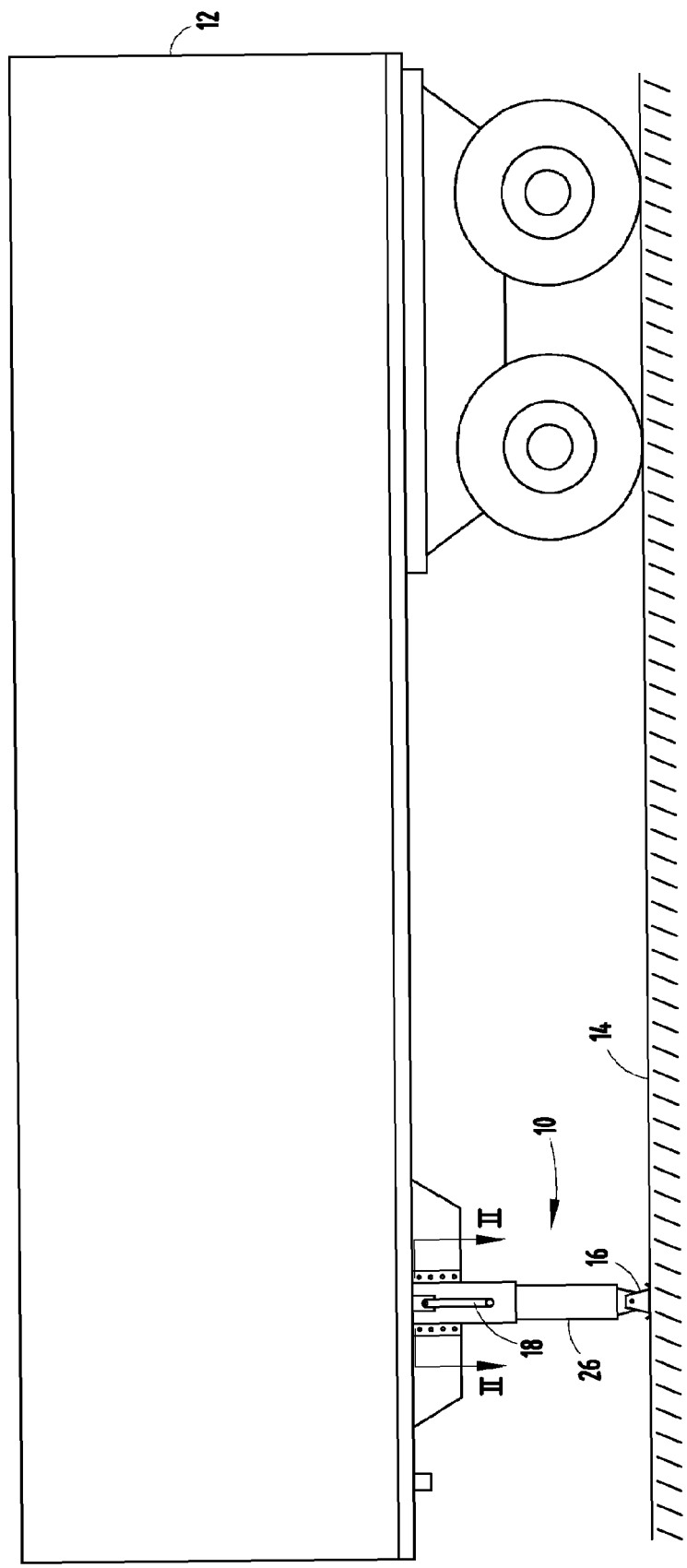

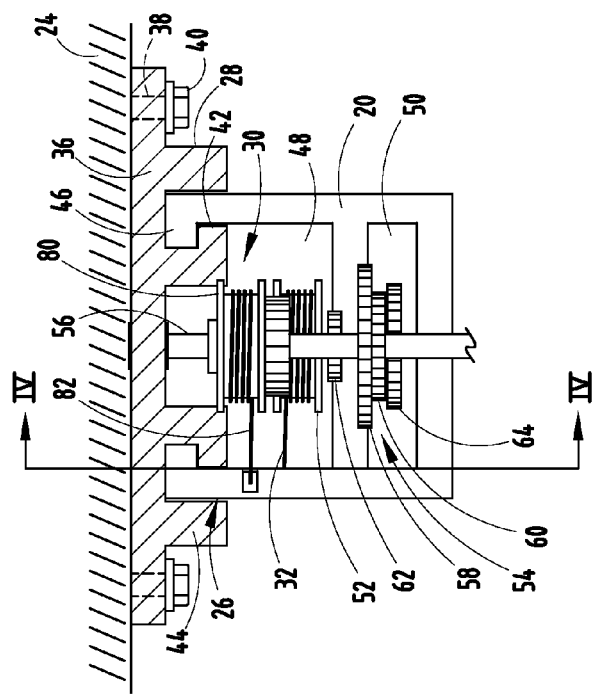
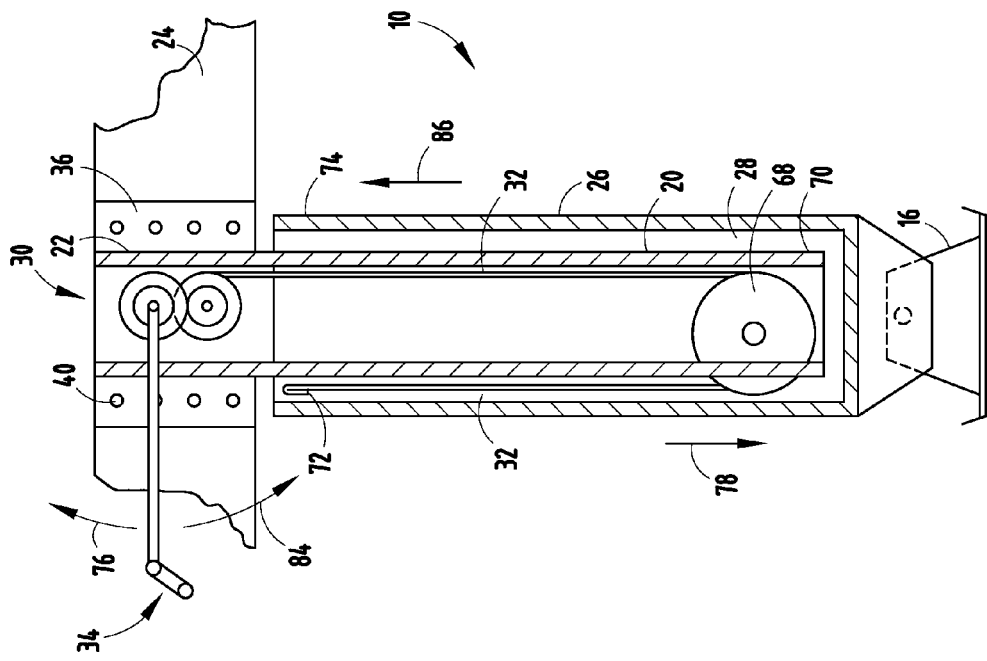

TELESCOPING LANDING GEAR

CROSS REFERENCE TO RELATED APPLICATION

This application claims the benefit of U.S. Provisional Application No. 60/687,781, filed Jun. 6, 2005, entitled TELESCOPING LANDING GEAR, which is hereby incorporated herein by reference in its entirety.

BACKGROUND OF THE INVENTION

The present invention relates to a no-lube telescoping, or sliding, landing gear utilizing high strength synthetic, or natural fiber ribbons or strands as support for extending or lifting an apparatus.

Landing gears are generally designed to have a gear system that motivates a landing portion to the ground thereby supporting an apparatus such as a trailer. Oftentimes these landing systems require frequent maintenance, including the addition of lubricants, to function properly. Additionally, to support high-weight loads, strong, heavy gearing mechanisms are required.

Thus, a landing gear that is lighter and stronger and functions properly without a lubricant is desired.

These and other features, advantages and objects of the present invention will be further understood and appreciated by those skilled in the art by reference to the following specification, and appended drawings.

SUMMARY OF THE INVENTION

One aspect of the present invention relates to a landing gear assembly that comprises a first leg member adapted to couple to a vehicle frame member, and a second leg member operably coupled to the first leg member and moveable between a raised storage position and a lowered-in use position. The landing gear assembly further comprises a flexible member operably coupled with the drive mechanism and the second leg, such that the drive mechanism extends the flexible member and moves the second leg from the storage position to the in-use position, and wherein the flexible member is adapted to support a weight exerted on the first and second leg members.

Another aspect of the present invention is a vehicle frame assembly that comprises a vehicle frame, and a landing gear assembly. The landing gear assembly comprises a first leg member adapted to couple to a vehicle frame member, and a second leg member telescopingly coupled to the first leg member and moveable between a raised storage position and a lowered in-use position. The landing gear assembly also comprises a winch assembly including a first pulley, and a transit pulley operably coupled to the first leg member. The landing gear assembly further comprises a flexible member operably coupled with the drive mechanism and the second leg, wherein the flexible member extends from the first pulley, about the transit pulley, and is fixedly coupled to the second leg member, the drive mechanism extending the flexible member and moving the second leg member from the storage position to the in-use position, and wherein the flexible member is adapted to support a weight exerted on the first and second legs.

Due to the heavy weight and cumbersome nature of standard landing gears, a significant weight advantage is achieved by replacing traditional threaded rod and gear mechanisms with pulleys/rollers and fibers. The present invention provides a landing gear having fibers that are of high tensile strength and withstand fatigue and elongation. Furthermore, the fibers are resistant to heat, chemicals, and degradation without compromising excellent flexibility that is better than steel cable. Moreover, the present inventive landing gear includes an uncomplicated design, can be operated by even unskilled workers, is efficient in use, capable of a long operating life, and is particularly well adapted for the proposed use.

BRIEF DESCRIPTION OF THE DRAWINGS

FIG. 1 is a side elevation of a semi-trailer unhitched from an associated truck tractor, and having a landing gear thereon supporting a front end of the semi-trailer;

FIG. 2 is a cross-sectional front side elevation view of the landing gear taken along the line II-II, FIG. 1;

FIG. 3 is a top cross-sectional view of the landing gear taken along the line III-III, FIG. 2;

DETAILED DESCRIPTION OF THE PREFERRED EMBODIMENTS

Figure 5:
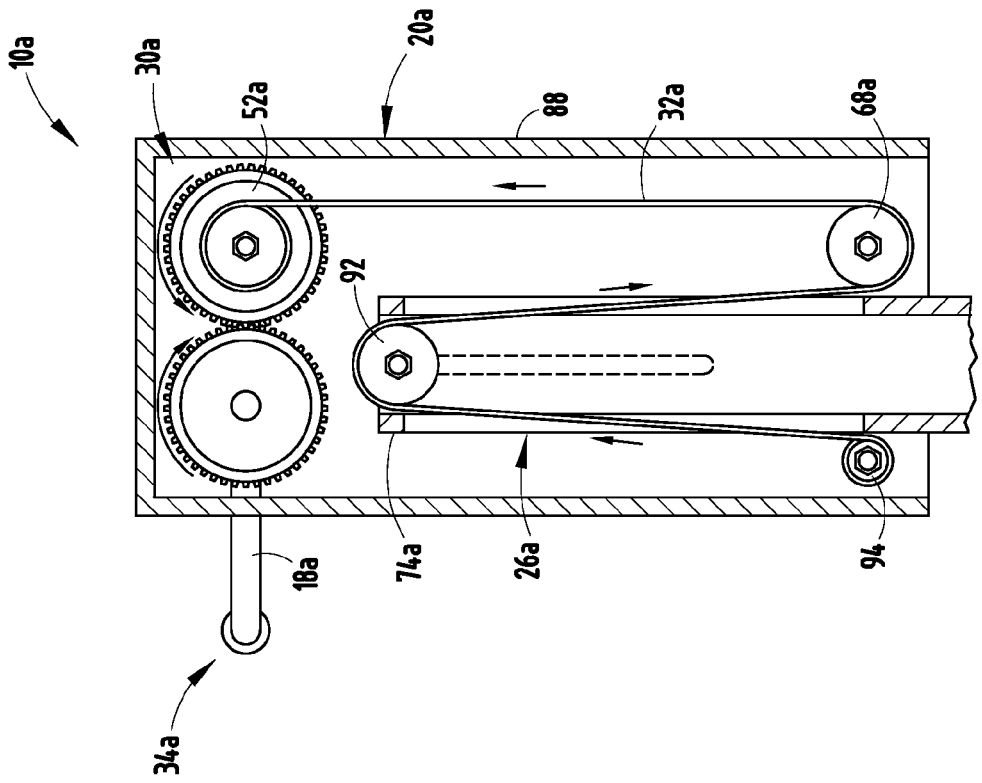
FIG. 5 is a perspective view of an alternative landing gear assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a landing gear assembly embodying the present invention. In the illustrated example, the landing gear assembly 10 supports a forward end of a semi-trailer 12. The landing gear 10 typically includes a pair of leg assemblies spaced across a width of the trailer 12 and located near respective front corners of the trailer 12. The landing gear assembly 10 is capable of extending to engage a ground surface 14 or other supporting surface to hold up the front end of the semi-trailer 12 as is well understood in the art. A shoe 16 of the landing gear assembly 10 is pivotally mounted on a lower portion thereof for engaging the ground surface 14. The landing gear assembly 10 is also capable of retracting to an up and out of the way position or a storage position when the semi-trailer 12 is being pulled over the road by a tractor (not shown). A crank handle 18 is used to adjust the landing gear assembly 10 between the raised storage position and the lowered in-use position, as described below. The following description is confined to the landing gear assembly 10 as illustrated in FIG. 1, however, it is noted that the landing gear assembly (not shown) associated and supporting an opposite side of the semi-trailer 12 is constructed and coupled to the trailer 12 in a similar manner. Such constructions are well understood by those of ordinary skill in the art and will not be further described herein.

The landing gear assembly 10 comprises a first leg member 20 fixedly coupled at a first end 22 to a vehicle frame member 24, and a second leg member 26 having an interior space 28 telescopingly receiving the first leg member 20 therein. A winch assembly 30 is connected to the first end 22 of the first leg member 20 and is operably coupled to the second leg member 26 by a flexible ribbon 32, as is described below. The winch assembly 30 is driven by a drive mechanism 34 that includes the crank handle 18.

The first leg member 20 (FIG. 3) includes a mounting plate portion 36 including a plurality of mounting apertures 38 that receive bolts 40 therein mounting the first leg member 28 to the vehicle frame member 24. The first leg member 20 also includes a T-shaped slide portion 42 that telescopingly engages the second leg member 26, as described below. The first leg member 20 further includes a pair of guide portions 44 spaced outside the slide portion 42 that guide the second leg member 26 when telescoping between the raised and lowered positions, as described below.

The second leg member 26 comprises a C-shaped, cross-sectional configuration including tab portions 46 that engage with the T-shaped slide portion 42 of the first leg member 20, thereby telescopingly coupling the first leg member 20 and the second leg member 26. The first leg member 20 and the second leg member 26 cooperate to form an interior space 48 within which the winch assembly 30 is located. The second leg member 26 further includes a longitudinally-extending pocket 50 that serves to reduce the overall weight of the landing gear assembly 10.

Figure 4:
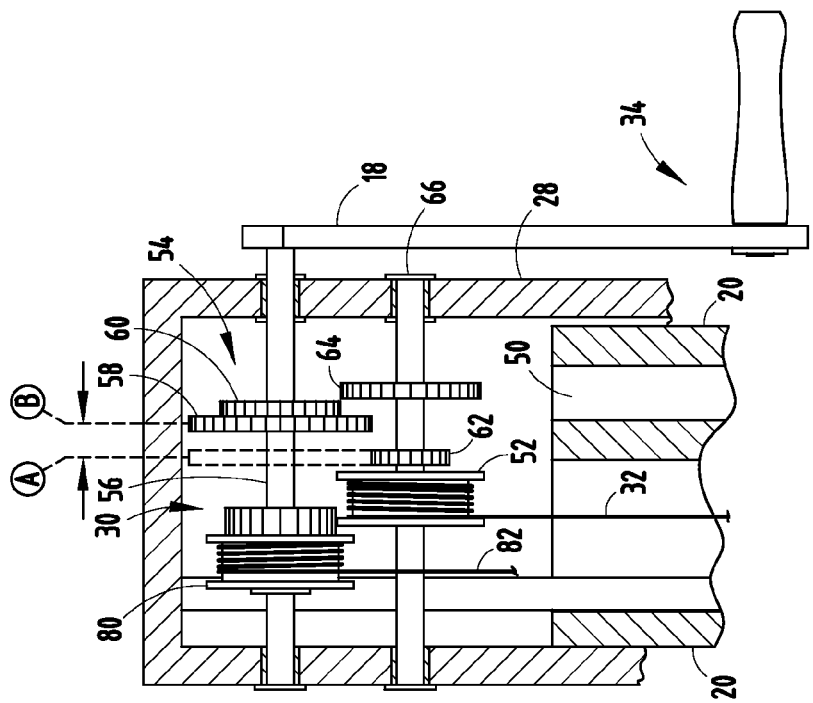
FIG. 4 is a front cross-sectional view of the landing gear taken along the IV-IV, FIG. 3.

The winch assembly 30 (FIG. 4) includes a first pulley 52 operably connected to the second leg member 26 by the flexible ribbon 32, and to the drive mechanism 34 by a gear train 54. The drive mechanism 34 includes the manual crank handle 18 fixedly connected to an input or drive shaft 56 that is shiftable between a first position providing a first drive speed, and a second position providing a second drive speed, as described in detail in U.S. patent application Ser. No. 11/412,688, filed on Apr. 27, 2006, entitled LANDING GEAR AND METHOD OF ASSEMBLY, which is a divisional of U.S. application Ser. No. 10/405,079, filed on Apr. 1, 2003, entitled LANDING GEAR AND METHOD OF ASSEMBLY, each of which is incorporated by reference herein in the entirety. A first input gear 58 and a second input gear 60 are fixed about the drive shaft 56. A first output gear 62 and a second output gear 64 are fixedly coupled to an output shaft 66, and are engagable with the first input gear 58 and the second input gear 60 when the drive shaft 56 is located in position A and position B, respectively. It is noted that the gearing ratios as provided between the input gears 58, 60 and the output gears 62, 64 drive the first pulley 52 at a relatively slower and faster speed when the drive shaft 56 is located in positions A and B, respectively.

As best illustrated in FIG. 2, the flexible ribbon 32 extends from the first pulley 52 downwardly about a transit pulley 68 that is rotationally coupled to a second end 70 of the first leg member 20, and upwardly to an end 72 that is fixedly connected to an upper end 74 of the second leg member 26. In operation, rotating the crank handle 18 in a first direction as represented by reference numeral 76 retracts or wraps the flexible ribbon 32 about the first pulley 52, thereby shortening the overall effective length of the flexible ribbon 32 and forcing the second leg member 26 downwardly with respect to the first leg member 20 in a direction as represented by directional arrow 78. A second pulley 80 (FIG. 4) is fixed for rotation with the drive shaft 56 and is coupled to the second leg member 26 by a second flexible ribbon 82, wherein an end of the second flexible ribbon 82 is fixedly connected to the second leg member 26. In operation, the second leg member 26 is retracted or moved from the lowered in-use position to the raised storage position by moving the handle 18 in a direction 84 which retracts or wraps the second flexible ribbon 82 about the second pulley 80, thereby moving the second leg member 26 upwardly in a direction 86 with respect to the first leg member 20.

The reference numeral 10a (FIG. 5) generally designates another embodiment of the present invention, utilizing additional pulleys therein to multiply the mechanical force generated. Since the landing gear assembly 10a is similar to the previously-described landing gear assembly 10, similar parts appearing in FIGS. 2-4 and FIG. 5, respectively, are represented by the same, corresponding reference numeral, except for the suffix "a" in the numerals of the latter. In the illustrated example, the second leg member 26a is telescopingly received within the first leg member 20a. The flexible ribbon 32a extends downwardly from the first pulley 52a of the winch assembly 30a, about a first transit pulley 68a pivotally coupled to a distal end 88 of the first leg member 20a, about a second transit pulley 92 that is pivotally connected to the upper end 74a of the second leg member 26a, and is fixedly connected at an end 94 to the distal end 88 of the first leg member 20. The landing gear assembly 10a further includes return mechanisms similar to that previously described with respect to the landing gear assembly 10. In operation, the landing gear assembly 10 operates in a similar manner to that of the landing gear assembly 10 as previously described.

Due to the heavy weight and cumbersome nature of standard landing gears, a significant weight advantage is achieved by replacing traditional threaded rod and gear mechanisms with pulleys/rollers and fibers. The present invention provides a landing gear having fibers that are of high tensile strength and withstand fatigue and elongation. Furthermore, the fibers are resistant to heat, chemicals, and degradation without compromising excellent flexibility that is better than steel cable. Moreover, the present inventive landing gear includes an uncomplicated design, can be operated by even unskilled workers, is efficient in use, capable of a long operating life, and is particularly well adapted for the proposed use.

In the foregoing description, it will be readily appreciated by those skilled in the art that modifications may be made to the invention without departing from the concepts disclosed herein.

The invention claimed is:

1. A landing gear assembly comprising:
a first leg member configured to couple to a vehicle frame member;
a second leg member operably coupled to the first leg member and movable between a raised storage position and a lowered in-use position;
a drive mechanism operably coupled with the first leg member; and
a flexible member operably coupled with the drive mechanism and the second leg, such that the drive mechanism extends the flexible member and moves the second leg from the storage position to the in-use position, and wherein the flexible member directly supports a weight exerted on the first and second legs.

2. The landing gear assembly of claim 1, further including:
a winch assembly including a first pulley; and
a transit pulley operably coupled to the first leg member, wherein the flexible member extends from the first pulley, about the transit pulley, and is fixedly coupled to the second leg member.

3. The landing gear assembly of claim 2, wherein the winch assembly further includes a gear train including a first gear operably coupled to the drive mechanism, and a second gear in mechanical communication with the first drive gear, the first and second gear forming a first gear ratio, and wherein the second gear is fixed for rotation with the first pulley.

4. The landing gear assembly of claim 3, wherein the gear train further includes a third gear operably coupled with the drive mechanism, and a fourth gear in communication with the third drive gear, the third and fourth gear forming a second gear ratio that is greater than the first gear ratio, and wherein the fourth gear is fixed for rotation with the first pulley.

5. The landing gear assembly of claim 4, wherein the first and second gears and the third and fourth gears are selectively engagable, thereby allowing a user to select the first and second gear ratios, respectively.

6. The landing gear assembly of claim 2, wherein the winch assembly further includes a second pulley and a second flexible member operably coupled with the second pulley and fixedly coupled to the second leg member, such that the winch assembly retracts the second flexible member about the second pulley and moves the second leg from the lowered in-use position to the raised storage position.

7. The landing gear assembly of claim 1, wherein the drive mechanism comprises a manual crank handle.

8. The landing gear assembly of claim 1, further including:
a winch assembly including a first pulley;
a first transit pulley operably coupled to the first leg member; and
a second transit pulley operably coupled to the second leg member, wherein the flexible member extends from the first pulley, about the first transit pulley, and about the second transit pulley, and is fixedly coupled to a select one of the first leg member and the second leg member.

9. The landing gear assembly of claim 1, wherein the flexible member comprises a ribbon.

10. The landing gear assembly of claim 1, wherein the flexible member comprises natural fibers.

11. The landing gear assembly of claim 1, wherein the second leg is telescopingly coupled to the first leg.

12. The landing gear assembly of claim 11, wherein the first leg member comprises a T-shaped cross-sectional configuration, and wherein the second leg member comprises a C-shaped cross-sectional configuration that receives the T-shaped configuration of the first leg member therein.

13. The landing gear assembly of claim 1, wherein the flexible member is operably coupled to a single second leg member.

14. A vehicle frame assembly comprising:
a vehicle frame; and
a landing gear assembly comprising:
a first leg member configured to couple to a vehicle frame member;
a second leg member telescopingly coupled to the first leg member and movable between a raised storage position and an lowered in-use position;
a winch assembly including a first pulley;
a transit pulley operably coupled to the first leg member; and
a flexible member operably coupled with the drive mechanism and the second leg, wherein the flexible member extends from the first pulley and about the transit pulley, and is fixedly coupled to the second leg member, the drive mechanism extending the flexible member and moving the second leg from the storage position to the in-use position, and wherein the flexible member directly supports a weight exerted on the first and second legs.

15. The vehicle frame assembly of claim 14, wherein the winch assembly further includes a gear train including a first gear operably coupled to the drive mechanism, and a second gear in mechanical communication with the first drive gear, the first and second gear forming a first gear ratio, and wherein the second gear is fixed for rotation with the first pulley.

16. The vehicle frame assembly of claim 15, wherein the gear train further includes a third gear operably coupled with the drive mechanism, and a fourth gear in communication with the third drive gear, the third and fourth gear forming a second gear ratio that is greater than the first gear ratio, and wherein the fourth gear is fixed for rotation with the first pulley.

17. The vehicle frame assembly of claim 16, wherein the first and second gears and the third and fourth gears are selectively engagable, thereby allowing a user to select the first and second gear ratios, respectively.

18. The vehicle frame assembly of claim 15, wherein the winch assembly further includes a second pulley and a second flexible member operably coupled with the second pulley and fixedly coupled to the second leg member, such that the winch assembly retracts the second flexible member about the second pulley and moves the second leg from the lowered in-use position to the raised storage position.

19. The vehicle frame assembly of claim 14, wherein the drive mechanism comprises a manual crank handle.

20. The vehicle frame assembly of claim 14, wherein the flexible member comprises a ribbon.

21. The vehicle frame assembly of claim 14, wherein the flexible member comprises natural fibers.

22. The vehicle frame assembly of claim 14, wherein the first leg member comprises a T-shaped cross-sectional configuration, and wherein the second leg member comprises a C-shaped cross-sectional configuration the receives that T-shaped configuration of the first leg member therein.

* * * * *